United States Patent [19]

Ohzu et al.

[11] Patent Number: 4,895,774

[45] Date of Patent: Jan. 23, 1990

[54] MOLTEN CARBONATE FUEL CELL

[75] Inventors: Hideyuki Ohzu; Yoshihiro Akasaka, both of Tokyo; Hiroshi Tateishi, Zushi; Takashi Ogawa, Yokohama, all of Japan

[73] Assignee: Kabushiki Kaisha Toshiba, Kawasaki, Japan

[21] Appl. No.: 310,309

[22] Filed: Feb. 14, 1989

[30] Foreign Application Priority Data

Feb. 17, 1988 [JP] Japan .................................. 63-32632
Mar. 17, 1988 [JP] Japan .................................. 63-64043
Mar. 17, 1988 [JP] Japan .................................. 63-64044
Mar. 25, 1988 [JP] Japan .................................. 63-69782

[51] Int. Cl.$^4$ ............................................ H07M 8/08
[52] U.S. Cl. ........................................ 429/35; 429/16; 429/46
[58] Field of Search ............................. 429/16, 46, 35

[56] References Cited

U.S. PATENT DOCUMENTS

| | | | |
|---|---|---|---|
| 3,867,206 | 2/1975 | Trocciola et al. | 429/35 |
| 4,480,017 | 10/1984 | Takeuchi et al. | 429/46 X |
| 4,548,874 | 10/1985 | Katz et al. | 429/35 X |
| 4,581,303 | 4/1986 | Pasco et al. | 429/46 |

Primary Examiner—Stephen J. Kalafut
Attorney, Agent, or Firm—Oblon, Spivak, McClelland, Maier & Neustadt

[57] ABSTRACT

A molten carbonate fuel cell comprising a pair of conductive electrodes, an electrolyte body sandwiched between the pair of conductive electrodes and consisting essentially of an electrolyte of an alkali carbonate mixture, more than 5 mole % to 15 mole % of magnesium carbonate with respect to the alkali carbonate mixture, and an electrolyte retaining material, fuel supplying means for supplying a fuel gas to one of the pair of conductive electrodes, and oxidant supplying means for supplying an oxidant gas to the other of the pair of conductive electrodes.

11 Claims, 7 Drawing Sheets

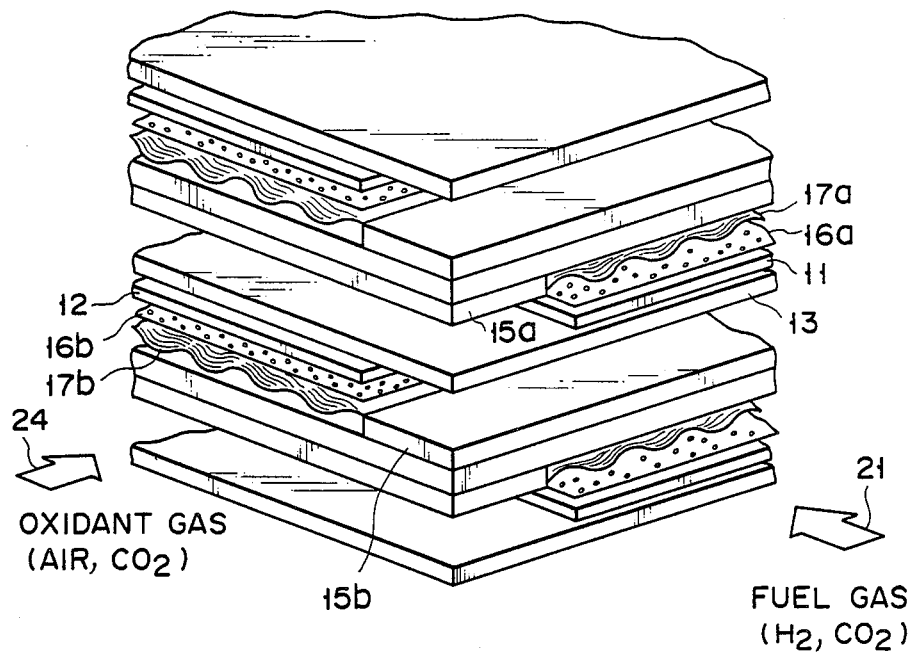
F I G. 3

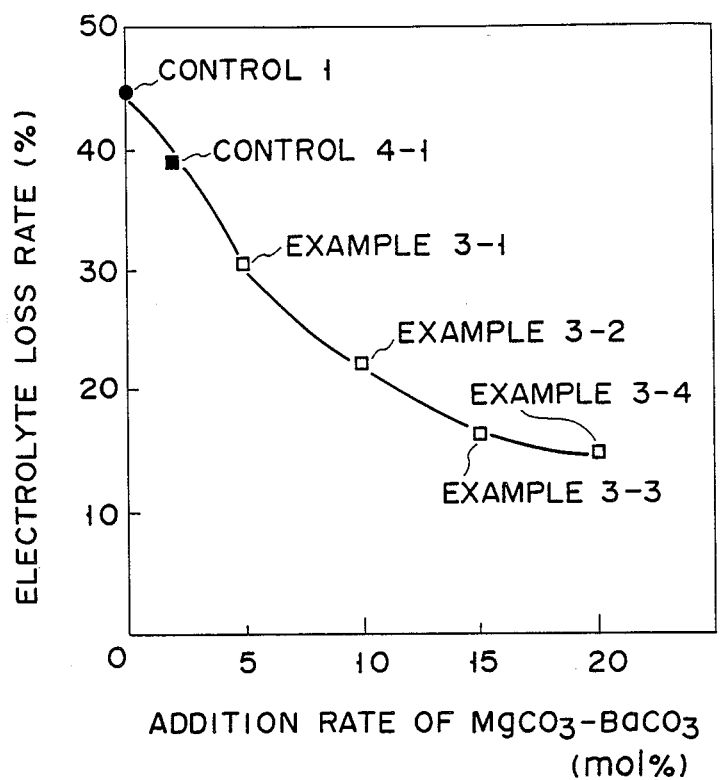
F I G. 6

MOLTEN CARBONATE FUEL CELL

BACKGROUND OF THE INVENTION

1. Field of the Invention

The present invention relates to a molten carbonate fuel cell and, more particularly, to a molten carbonate fuel cell in which an electrolyte body sandwiched between a pair of conductive electrodes is improved.

2. Description of the Related Art

A basic structure of a molten carbonate fuel cell is shown in FIG. 1. An electrolyte body 3 retaining an electrolyte consisting of an alkali carbonate is sandwiched between an anode (fuel electrode) 1 and a cathode (air electrode) 2 which serve as a pair of conductive electrodes. Two housings 4a and 4b abut against peripheral portions of both surfaces of the electrolyte body 3. The anode 1 and the cathode 2 are stored in the housings 4a and 4b, respectively. Corrugated collectors 5a and 5b are arranged between the inner surface of one housing 4a and the anode 1 and between the inner surface of the other housing 4b and the cathode 2, respectively. A supply port 6 for supplying a fuel gas ($H_2$ and $CO_2$) and an exhaust port 7 for exhausting an exhaust gas ($CO_2$ and $H_2O$) are formed in the housing 4a in which the anode 1 is arranged. A supply port 8 for supplying an oxidant gas (air and $CO_2$) and an exhaust port 9 for exhausting an exhaust gas ($N_2$) are formed in the housing 4b in which the cathode 2 is arranged.

In the molten carbonate fuel cell shown in FIG. 1, an alkali carbonate in the electrolyte body 3 is melted at a high temperature. The fuel gas ($H_2$ and $CO_2$) is supplied to the anode 1 through the supply port 6 of the housing 4a, while the oxidant gas (air and $CO_2$) is supplied to the cathode 2 through the supply port 8 of the housing 4b. Reactions represented by formulas (1) and (2) are performed at the anode 1 and the cathode 2, respectively:

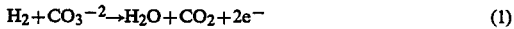

$$H_2 + CO_3^{-2} \rightarrow H_2O + CO_2 + 2e^- \quad (1)$$

$$\tfrac{1}{2} + CO_2 + 2e^- \rightarrow CO_3^{-2} \quad (2)$$

An electrolyte body used in the above molten carbonate fuel cell conventionally comprises an electrolyte consisting of an alkali carbonate mixture and an electrolyte retaining material for preventing the electrolyte from flowing out from the electrolyte body since the electrolyte is melted during a high-temperature operation. The alkali carbonate mixture is used as a mixture of two or three salts selected from $Li_2CO_3$, $K_2CO_3$, and $Na_2CO_3$. The electrolyte retaining material is a fine powder having a particle size of 0.05 to 0.5 $\mu$m and consisting of $\gamma$-$LiAlO_2$ and $\beta$-$LiAlO_2$. The electrolyte body allows the passage of carbonic acid ions ($CO_3^{-2}$) and also serves as a gas permeation barrier layer for preventing direct mixing (gas crossover) of the reaction gases between the anode and the cathode. In order to provide these functions, it is necessary to sufficiently retain the electrolyte in the electrolyte body. An outflow of the electrolyte (electrolyte loss) increases an internal resistance and causes gas crossover.

In the electrolyte body having the above composition, however, an electrolyte loss progresses during the operation of several thousands of hours to shorten the life time of the cell. The electrolyte loss is caused by (1) evaporation of the electrolyte in a gaseous state and (2) outflow of the electrolyte in a liquid state. The cause (2) is considered to be a major cause of the electrolyte loss.

The outflow of the electrolyte in the liquid state occurs because the electrolyte retaining material cannot sufficiently retain the alkali carbonate.

A conventional technique for improving an electrolyte retaining material of the electrolyte body or increasing a specific surface area is employed. However, the outflow of the electrolyte cannot be effectively prevented.

A technique for improving the electrolyte body is reported by C. Y. Yuh and A. Pigeaud, "Determination of Optimum Electrolyte Composition for Molten Carbonate Fuel Cells Literature Review" (1987), DOE/MC/23264-2507 (DE88001015). This literature describes that an electrolyte body added with 0.5 wt % of MgO and 0.5 wt % of BaO is used to suppress the dissobution of NiO from a cathode consisting of a nickel oxide. Another technique for improving an electrolyte body is reported by Joel D. Doyon, Thomas Gilbert, Geottrey Davis, and Lawrence Paetch, J. Electroche, Soc., 34 (1987) 3035-38. In this literature, an electrolyte body added with 1 wt % of MgO and SrO is used to suppress the dissolution of NiO from a cathode consisting of a nickel oxide. In addition, still another technique for improving an electrolyte body is proposed by Hideyuki Ohzu et al., "Effect of Group II-A Element Addition on Reduction of Elution of Cathode for Molten Carbonate Fuel Cell", 1987, Lecture Papers, Corp. Yogyo Kyokai. In this literature, an electrolyte body added with 5 mol % of $MgCO_3$ is used to suppress the dissolution of Ni from a cathode consisting of a nickel porous sintered body.

SUMMARY OF THE INVENTION

It is an object of the present invention to provide a molten carbonate fuel cell having a long life time wherein an outflow of an electrolyte from an electrolyte body is reduced to prevent a increase in internal resistance and occurrence of gas crossover.

It is another object of the present invention to provide a high-performance, long-life time molten carbonate fuel cell in which an outflow of an electrolyte from a edge portion of an electrolyte body which abuts against an edge seal plate is reduced to improve a gas sealing performance between the electrolyte body and the edge seal plate.

According to an aspect of the present invention, there is provided a molten carbonate fuel cell, comprising a pair of conductive electrodes; an electrolyte body sandwiched between the pair of conductive electrodes and consisting essentially of an electrolyte of an alkali carbonate mixture, more than 5 mol % to 15 mol % of magnesium carbonate with respect to the alkali carbonate mixture, and an electrolyte retaining material; fuel supplying means for supplying a fuel gas to one of the pair of conductive electrodes; and oxidant supplying means for supplying an oxidant gas to the other of the pair of conductive electrodes.

According to another aspect of the present invention, there is provided a molten carbonate fuel cell, comprising a pair of conductive electrodes; an electrolyte body sandwiched between the pair of conductive electrodes and consisting essentially of an electrolyte of an alkali carbonate mixture, a carbonate mixture, and an electrolyte retaining material, the carbonate mixture consisting of magnesium carbonate and at least one material selected from the group consisting of barium carbonate, calcium carbonate, and strontium carbonate, the carbonate mixture being contained in 5 to 20 mol % with respect to the mixing alkali carbonate, the magnesium carbonate being used in 2 to 15 mol % with respect to the alkali carbonate mixture; fuel supplying means for supplying a fuel gas to one of the pair of conductive electrodes; and oxidant supplying means for supplying an oxidant gas to the other conductive electrode.

According to still another aspect of the present invention, there is provided a molten carbonate fuel cell, comprising a pair of conductive electrodes; an electrolyte body sandwiched between the pair of conductive electrodes and consisting essentially of an electrolyte of an alkali carbonate mixture, at least one carbonate added in an edge portion of the electrolyte body in a range of 15 to 35 mol % with respect to the alkali carbonate mixture, and selected from the group consisting of magnesium carbonate, barium carbonate, calcium carbonate, and strontium carbonate, and an electrolyte retaining material; fuel supplying means for supplying a fuel gas to one of the pair of conductive electrodes; and oxidant supplying means for supplying an oxidant gas to the other conductive electrode.

BRIEF DESCRIPTION OF THE DRAWINGS

FIG. 3 is an exploded perspective view showing a main part of the fuel cell in FIG. 2;

FIG. 6 is a graph showing a relationship between an addition rate of $MgCO_3$-$BaCO_3$ and an electrolyte loss rate.

DETAILED DESCRIPTION OF THE INVENTION

Figure 1:
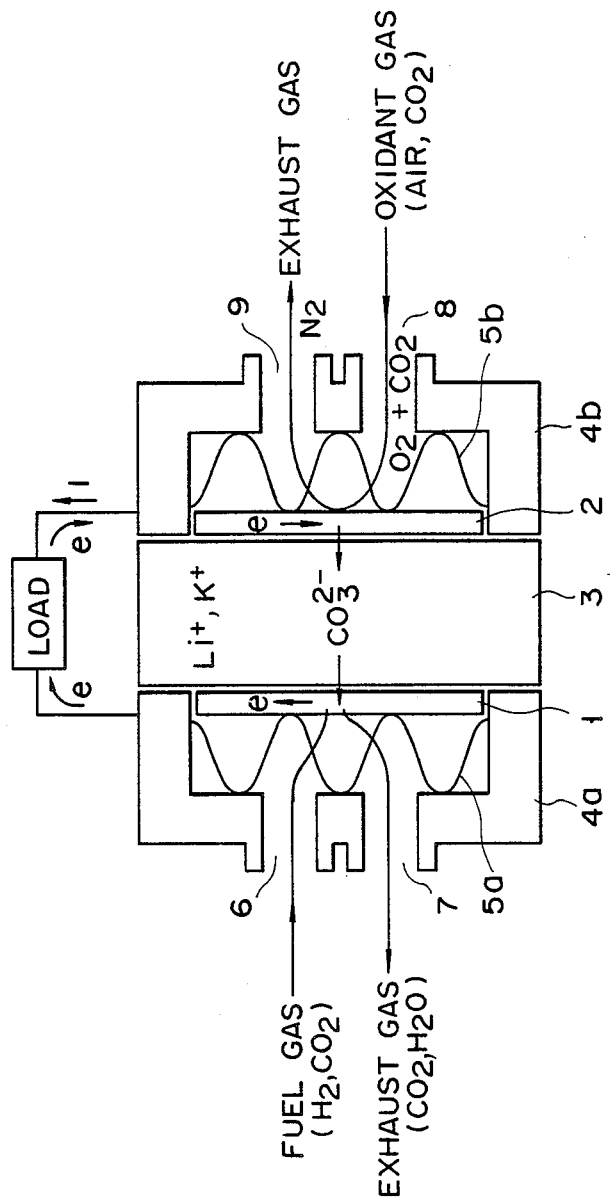
FIG. 1 is a schematic view showing a basic structure of a molten carbonate fuel cell.

A molten carbonate fuel cell according to the present invention will be described with reference to FIGS. 2 and 3.

The molten carbonate fuel cell according to the present invention comprises an anode (fuel electrode) 11, a cathode (air electrode) 12, and an electrolyte body 13 containing an electrolyte and sandwiched between the electrodes 11 and 12. The anode 11, the cathode 12, and the electrolyte body 13 constitute a unit cell. A number of unit cells are stacked, with separators 14 interposed between then. A pair of opposing edge portions of the anode 11 located on the upper surface of the electrolyte body 13 are located inward from the edge of the electrolyte body 13 by a predetermined distance. The edge seal plates 15a are located between the separator 14 and each edge portion of the electrolyte body 13 over which the anode 11 does not extents. A pair of edges of the cathode 12 located on the lower surface of the electrolyte body 13 and extending in a direction perpendicular to the edge seal plates 15a are located inward from the edge of the electrolyte body 13 by a predetermined distance. The edge seal plates 15b are located between the separator 14 and each edge portion of the electrolyte body 13 over which the cathode 12 does not extend. A conductive perforated plate 16a serving as a collector and a corrugated plate 17a are sequentially stacked from the side of the anode 11 in a space (i.e., a full gas flow space) defined by the anode 11, the separator 14, and the edge seal plates 15a. A conductive perforated plate 16b serving as a collector and a corrugated plate 17b are sequentially stacked from the side of the cathode 12 in a space (i.e., an oxidant gas flow space) defined by the cathode 12, the separator 14, and the edge seal plates 15b. Manifolds 19 each having a frame-like flange 18 are located at four side surfaces of a stacked power-generating assembly obtained by stacking unit cells, with the separators 14 interposed between then. Four frame-like manifold seal plates 20 are interposed between the flanges 18 of the manifolds 19 and the four side surfaces of the stacked power-generating assembly, respectively. A supply pipe 22 for supplying a fuel gas 21 is connected to a manifold (not shown) which corresponds to one side surface of the power-generating assembly to which the fuel gas flow space is exposed. A gas exhaust pipe 23 is connected to the manifold 19 at the position opposite to the supply pipe 22. A supply pipe 25 for supplying an oxidant gas 24 is connected to a manifold (not shown) which corresponds to one side surface of the power-generating assembly to which the oxidant gas flow space is exposed. A gas exhaust pipe 26 is connected to the manifold 19 opposite to the supply pipe 25.

The electrodes 11 and 12 are made of sintered bodies of, e.g., a nickel-based alloy or a porous nickel-based alloy.

The separators 14, the edge seal plates 15a and 15b, the perforated plates 16a and 16b, and the corrugated plates 17a and 17b are made of, e.g., stainless steel.

A gas mixture of, e.g., hydrogen ($H_2$) and carbon dioxide ($CO_2$) can be used as the fuel gas 21. A gas mixture of, e.g., air or oxygen ($O_2$) and carbon dioxide ($CO_2$) can be used as the oxidant gas 24.

The electrolyte body 13 consists essentially of an electrolyte of an alkali carbonate mixture, magnesium carbonate used in more than 5 mol % to 15 mol % with respect to the alkali carbonate mixture, and an electrolyte retaining material.

Examples of the alkali carbonate mixture are a mixture of lithium carbonate ($Li_2CO_3$) and potassium carbonate ($K_2CO_2$), a mixture of $Li_2CO_3$ and sodium carbonate ($Na_2CO_3$), and a mixture of $Li_2CO_3$, $K_2CO_3$, and $Na_2CO_3$.

Examples of the magnesium carbonate ($MgCO_3$) are magnesium carbonate itself, and a compound containing magnesium carbonate (e.g., basic magnesium carbonate, i.e., $4MgCO_3 \cdot Mg(OH)_2 \cdot 5H_2O$).

The content of magnesium carbonate in the electrolyte body is defined as described above due to the following reason. When the content of magnesium carbonate is 5 mol % or less, a sufficient electrolyte loss prevention effect cannot achieved. However when the content of magnesium carbonate exceeds 15 mol %, a desirable voltage cannot be extracted at the initial operation period of the cell. The amount of magnesium carbonate with respect to the alkali carbonate mixture serving as the electrolyte preferably falls within the range of 4 to 14 mol %, and more preferably 8 to 12 mol %.

Magnesium carbonate is contained in each edge portion of the electrolyte body, with which an edge seal plate is in contact, is a higher concentration than in the remaining portion of the electrolyte body and falls within the range of 15 to 35 mol %. Since the edge portion of the electrolyte body is not directly associated with the operation of the fuel cell, the magnesium carbonate in the edge portion has higher than in the remaining portion of the electrolyte body. In addition, the content of magnesium carbonate at the edge portion of the electrolyte body is defined due to the following reason. When the content of magnesium carbonate at the edge portion of the electrolyte body is less than 15 mol %, an electrolyte loss preventing effect from the edge portion of the electrolyte body cannot be achieved, and sealing performance between the edge seal plate and the electrolyte body is degraded. However, when the content of magnesium carbonate at the edge portion of the electrolyte body exceeds 35 mol %, moldability for the electrolyte body itself is impaired.

An example of the electrolyte retaining material is a fine powder having a particle size of 0.05 to 0.5 μm and consisting of γ-LiAlO$_2$ or β-LiAlO$_2$. The electrolyte retaining material preferably has an initial specific surface area of 7 to 40 m$^2$/g. The amount of the electrolyte retaining material with respect to an alkali carbonate mixture (electrolyte) in the electrolyte body preferably falls within the range of 30 to 50 wt % in favor of the electrolyte loss preventing effect.

Another electrolyte body according to the present invention consists essentially of an electrolyte of the alkali carbonate mixture, a carbonate mixture, and an electrolyte retaining material. The carbonate mixture consists of magnesium carbonate (MgCO$_3$) and at least one material selected from the group consisting of barium carbonate (BaCO$_3$), calcium carbonate (CaCO$_3$), and strontium carbonate (SrCO$_3$). The carbonate mixture is used in 5 to 20 mol % with respect to the alkali carbonate mixture, the magnesium carbonate being used in 2 to 15 mol % with respect to the alkali carbonate mixture.

The content of the carbonate mixture in the electrolyte body and the content of magnesium carbonate in the carbonate mixture are defined due to the following reason. When the content of the carbonate mixture is less than 5 mol %, a sufficient effect for preventing electrolyte elution can not be obtained. However, when the content of the carbonate mixture exceeds 20 mol %, a desirable voltage cannot be extracted in the initial operation period of the cell. When the content of magnesium carbonate in the carbonate mixture is less than 2 mol %, a sufficient effect for preventing electrolytic elution cannot be achieved. When the content of magnesium carbonate exceeds 15 mol %, a desirable voltage cannot be extracted in the initial operation period of the cell. The amount of the carbonate mixture with respect to the alkali carbonate mixture serving as the electrolyte preferably falls within the range of 7 to 15 mol %, and more preferably 8 to 12 mol %. A mixture of magnesium carbonate and strontium carbonate among the carbonate mixtures is effective to minimize outflow of the electrolyte.

The carbonate mixture is contained in each edge portion of the electrolyte body, with which an edge seal plate is in contact, is higher concentration than in the remaining portion of the electrolyte body and falls within the range of 15 to 35 mol %. Since the edge portion of the electrolyte body is not directly associated with the operation of the fuel cell, the carbonate mixture in the edge portion of the electrolyte body has higher than in the remaining portion of the electrolyte body. The content of magnesium carbonate at the edge portion of the electrolyte body is defined due to the following reason. When the content of the carbonate mixture at the edge portion of the electrolyte body is less than 15 mol %, a sufficient effect for preventing outflow of the electrolyte from the edge portion of the electrolyte body cannot be achieved, and sealing performance between the edge seal plate and the electrolyte body is impaired. When the content of the carbonate mixture at the edge portion of the electrolyte body exceeds 35 mol %, moldability of the electrolyte body itself is impaired.

Still another electrolyte body according to the present invention consists essentially of an electrolyte of the alkali carbonate mixture, at least one carbonate, and an electrolyte retaining material. The carbonate is added at an edge portion (i.e., a contact portion with an edge seal plate), used in 15 to 35 mol % with respect to the alkali carbonate mixture, and selected from the group consisting of magnesium carbonate, barium carbonate, calcium carbonate, and strontium carbonate.

The content of the carbonate at the edge portion of the electrolyte body is defined due to the following reason. When the content of the carbonate at the edge portion of the electrolyte body is less than 15 mol %, a sufficient effect for preventing outflow of the electrolyte from the edge portion of the electrolyte body cannot be achieved, and sealing performance between the edge seal plate and the electrolyte body is impaired. When the content of the carbonate at the edge portion of the electrolyte body exceeds 35 mol %, moldability of the electrolyte body itself is impaired.

A reinforcing agent such as an alumina filler can be added to each electrolyte body described above.

Each electrolyte body can be manufactured by a molding means such as a conventional hot pressing method and a conventional doctor blade method. Fabrication of an electrolyte body by the doctor blade method is exemplified by an electrolyte body consisting essentially of an electrolyte of an alkali carbonate mixture, magnesium carbonate added in the range of 5 mol % to 15 mol % with respect to the alkali carbonate mixture, and an electrolyte retaining material.

An electrolyte of an alkali carbonate mixture, magnesium carbonate mixed in the range of 5 mol % to 15 mol % with respect to the alkali carbonate mixture, an electrolyte retaining material, and an organic binder are mixed, and milled in the presence of an organic solvent to prepare a milled material. Examples of the organic binder are polyvinylbutyral, dibutylphthalate, and acrylic resin. Examples of the organic solvent are toluene, xylene, and methyl ethyl ketone. The milled material is formed by pressing, tape casting, or rolling to prepare a sheet-like electrolyte body. One or both of the anode and the cathode are impregnated with the electrolyte of the alkali carbonate mixture. The sheet-like electrolyte body is sandwiched between the anode and the cathode to prepare a unit cell shown in FIG. 2. A number of unit cells are stacked, with the separators interposed between then to obtain a stacked power-generating assembly. The four manifolds are respectively mounted on the four side surfaces of the power-generating assembly to assemble a fuel cell. Thereafter, the fuel cell is heated to an operating temperature. The electrolyte melted in the electrode is diffused and filled in the pores formed upon evaporation of the organic binder in the electrolyte body, thereby obtaining an electrolyte body.

According to the present invention, the electrolyte body consists essentially of the electrolyte of the alkali carbonate mixture, a carbonate mixture of magnesium carbonate alone or magnesium carbonate and at least one material selected from the group consisting of barium carbonate, calcium carbonate, and strontium carbonate, and the electrolyte retaining material. Melting of the electrolyte in the electrolyte body and the viscosity of the electrolyte in the liquid state during the operation can be increased, and therefore an electrolyte loss (i.e., outflow of the electrolyte) can be minimized. A mechanism for increasing the viscosity in the liquid state upon addition of magnesium carbonate singly or the carbonate mixture in the electrolyte body is not explicitly clarified. However, the increase in viscosity can be assumed to be achieved by the following mechanism. That is, the viscosity of the alkali carbonate mixture itself is increased due to addition o magnesium carbonate singly or the carbonate mixture. The thickness of the electrolyte layer (adhering layer which covers the surface of $LiAlO_2$ serving as the electrolyte retaining material is increased to increase an apparent volume concentration, thereby increasing the viscosity of the system. For this reason, outflow of the electrolyte from the electrolyte body can be suppressed. Therefore, the outflow of the electrolyte from the electrolyte body is suppressed, thus reducing the loss of electrolyte. Owing to the reduced loss of electrolyte, the body has high conductance, and the gas crossover is suppressed. Therefore, a molten carbonate fuel cell having a long operation time and a long life time can be obtained.

15 to 35 mol % of at least one carbonate selected from the group consisting of magnesium carbonate, barium carbonate, calcium carbonate, and strontium carbonate with respect to the alkali carbonate mixture serving as an electrolyte are added to each edge portion of the electrolyte body which contacts an edge seal plate. The viscosity at the edge of the electrolyte body can be increased, and outflow of the electrolyte from the electrolyte body can be suppressed. For this reason, a gas sealing performance between the electrolyte body and the edge seal plate can be improved, and reduction in electrolyte loss can be achieved. Therefore, a molten carbonate fuel cell having a long operation time and a long life time can be obtained.

DESCRIPTION OF THE PREFERRED EMBODIMENT

The present invention will be described in detail by way of its examples.

Examples 1-1 & 1-2

10 mol % and 15 mol % of $MgCO_3$ were added to two portions of an alkali carbonate mixture ($Li_2CO_3$: 62 mol %, $K_2CO_3$: 38 mol %) serving as an electrolyte to prepare two kinds of powder mixtures. 35 wt % of $LiAlO_2$ having a specific surface area of 10 to 20 $m^2/g$ were mixed in each powder mixture. Each resultant mixture was placed in an alumina pot, and acetone was added thereto. The resultant mixture was mixed and milled for 20 hours and was dried. Each dried powder mixture was pressed at 465° C. and 300 $kg/cm^2$ for an hour. Therefore, two kinds of electrolyte bodies each having a thickness of 2.3 mm, a width of 40 mm, and a length of 40 mm were obtained.

Control 1

An electrolyte body was manufactured following the same procedures as in Example 1-1 except that 35 wt % of $LiAlO_2$ having a specific surface area of 10 to 20 $m^2/g$ were mixed in an alkali carbonate mixture ($Li_2CO_3$: 62 mol %, $K_2CO_3$: 38 mol %) as an electrolyte, the resultant mixture was placed in an alumina pot to which acetone was added, and the resultant mixture was mixed and milled for 20 hours and dried.

Controls 2-1 & 2-2

Two kinds of electrolyte bodies were manufactured following the same procedures as in Example 1-1 except that 5 mol % and 20 mol % of $MgCO_3$ were added to two portions of an alkali carbonate mixture ($Li_2CO_3$: 62 mol %, $K_2CO_3$: 38 mol %) serving as an electrolyte to prepare two kinds of powder mixtures, 35 wt % of $LiAlO_2$ having a specific surface area of 10 to 20 $m^2/g$ were mixed in each powder mixture, each resultant mixture was placed in an alumina pot, acetone was added thereto, and each mixture was mixed and milled for 20 hours and dried.

Figure 2:
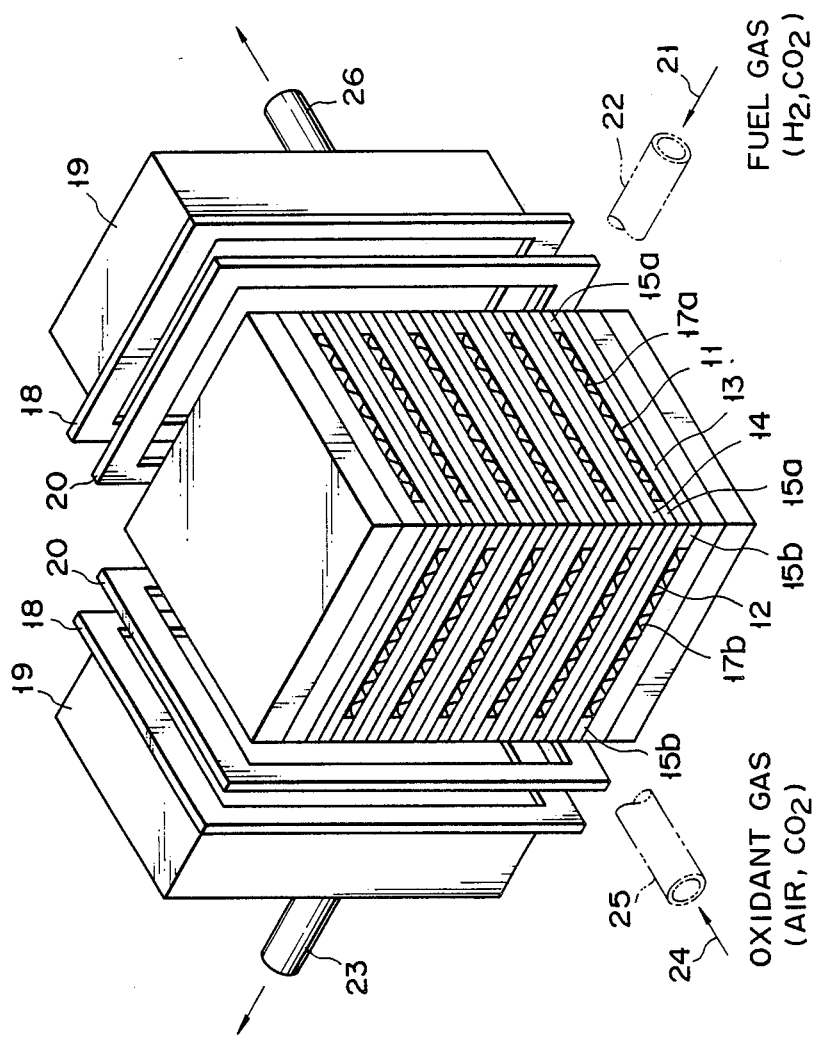
FIG. 2 is a perspective view showing a general structure of a molten carbonate fuel cell according to the present invention.
Figure 4:
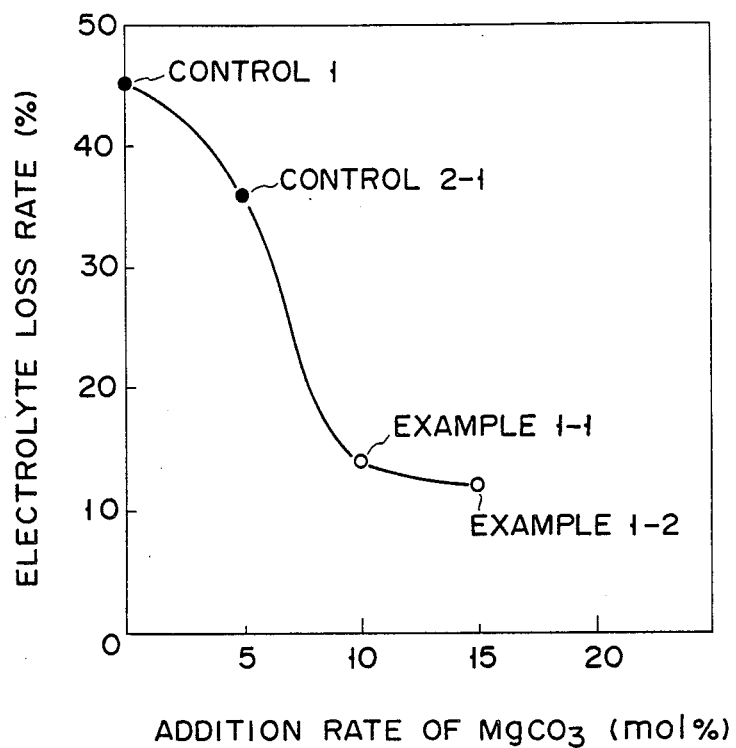
FIG. 4 is a graph showing a relationship between an addition rate of $MgCO_3$ and an electrolyte loss rate.

Molten carbonate fuel cells shown in FIGS. 2 and 3 were assembled by using the electrolyte bodies obtained in Examples 1-1 and 1-2 and Controls 1, 2-1, and 2-2, anodes and cathodes both of which were made of a nickel-based alloy, and separators, edge seal plates, perforated plates, and corrugated plates which were made of stainless steel. A gas mixture of 80 vol % of $H_2$ and 20 vol % of $CO_2$ was supplied to the anode of each fuel cell as a fuel gas, and a gas mixture of 70 vol % of air and 30 vol % of $CO_2$ gas was supplied to the cathode of each fuel cell as an oxidant. A power-generating test of these fuel cells was performed with a load of 150 $mA/cm^2$ at 650° C. The power-generating test was continuously performed for 2,000 hours. After 2,000 hours, electrolyte loss amounts and cell performance were measured. The relationship between the addition rate of $MgCO_3$ and the electrolyte loss rate is shown in FIG. 4. The cell performance is summarized in Table 1. An initial voltage of each fuel cell in Table 1 was 0.850 V.

TABLE 1

|  | Addition Rate of $MgCO_3$ (mol %) | Cell Performance (V) |
| --- | --- | --- |
| Control 1 | 0 | 0.582 |
| Control 2-1 | 5 | 0.631 |
| Example 1-1 | 10 | 0.810 |
| Example 1-2 | 15 | 0.784 |
| Control 2-2 | 20 | 0.230 |

As shown in FIG. 4 and Table 1, the electrolyte losses of the fuel cell having the electrolyte body of Control 1 which was not added with $MgCO_3$ and the fuel cell having the electrolyte body of Control 2-1 which had a small mol % of $MgCO_3$ of 5 mol % were 45% and 36% after 2,000 hours, and their cell performance was given by low voltages of 0.582 V and 0.631 V. In addition, in the fuel cells having the electrolyte bodies of Controls 1 and 2-1, crossover of the reaction gases was confirmed by analysis results of gas chromatography at the time of power generation. To the contrary, the fuel cells having the electrolyte bodies of Examples 1-1 and 1-2 which were added with 10 mol % and 15 mol % of $MgCO_3$ had low electrolyte losses of 14% and 12% after 2,000 hours, and their power-generating performance was proved to be excellent. The electrolyte loss of the fuel cell having the electrolyte body of Control 2-2 which was added with 20 mol % of $MgCO_3$ was 12%, which was as low as the electrolyte loss of Example 1-2. However, the cell performance was very poor (0.230 V) as compared with the cells in Examples 1-1 and 1-2.

Examples 2-1-2-4

A total of 5 mol % of $MgCO_3$ (2.5 mol %) and $SrCO_3$ (2.5 mol %), a total of 10 mol % of $MgCO_3$ (5 mol %) and $SrCO_3$ (5 mol %), a total of 15 mol % of $MgCO_3$ (7.5 mol %) and $SrCO_3$ (7.5 mol %), and a total of 20 mol % of $MgCO_3$ (10 mol %) and $SrCO_3$ (10 mol %) were added to four portions of an alkali carbonate mixture ($Li_2CO_3$: 62 mol %, $K_2CO_3$: 38 mol %) serving as an electrolyte to prepare four kinds of powder mixtures. $MgCO_3$ was basic magnesium carbonate ($4MgCO_3.Mg(OH)_2.5H_2O$) and was added to obtain the molar amounts defined above with respect to $MgCO_3$. 35 wt % of $LiAlO_2$ having a specific surface area were added to each powder mixture. Each resultant mixture was placed in an alumina pot, and acetone was added thereto. The resultant mixture was mixed and milled for 20 hours and was dried. Each dried powder mixture was pressed at 465° C. and 300 kg/cm² for an hour. Therefore, four kinds of electrolyte bodies each having a thickness of 2.3 mm, a width of 40 mm, and a length of 40 mm were obtained.

Controls 3-1 & 3-2

Two kinds of electrolyte bodies were manufactured following the same procedures as in Example 2-1 except that a total of 2 mol % of $MgCO_3$ (1 mol %) and $SrCO_3$ (1 mol %) and a total of 24 mol % of $MgCO_3$ (12 mol %) and $SrCO_3$ (12 mol %) were added to two portions of an alkali carbonate mixture ($Li_2CO_3$: 62 mol %, $K_2CO_3$: 38 mol %) serving as an electrolyte to the prepare two kinds of powder mixtures, 35 wt % of $LiAlO_2$ having a specific surface area of 10 to 20 m²/g were mixed in each powder mixture, each resultant mixture was placed in an alumina pot, acetone was added thereto, and each mixture was mixed and milled for 20 hours and dried.

Figure 5:
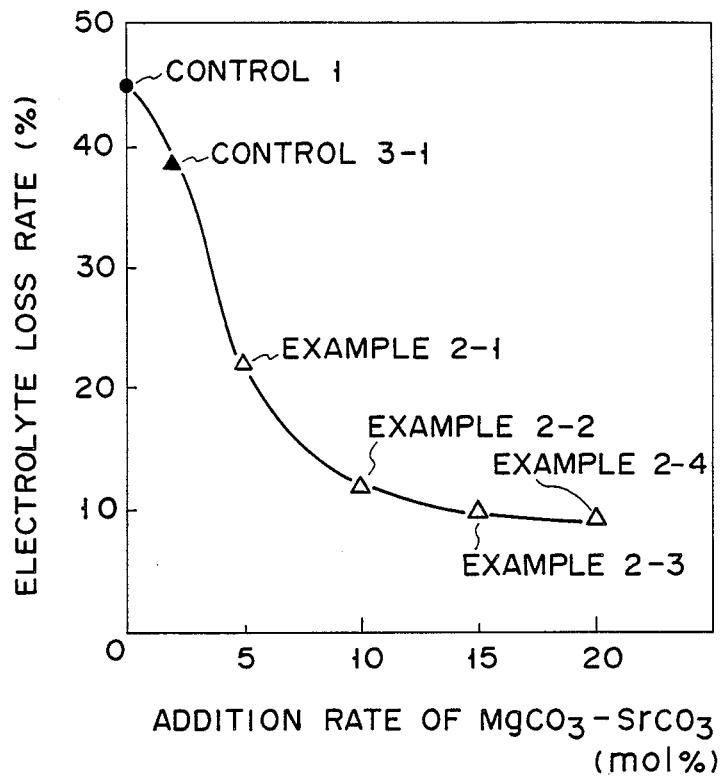
FIG. 5 is a graph showing a relationship between an addition rate of $MgCO_3$-$SrCO_3$ and an electrolyte loss rate.

Molten carbonate fuel cells shown in FIGS. 2 and 3 were assembled following the same procedures as in Example 1-1 except that the electrolyte bodies in Examples 2-1 to 2-4 and Controls 3-1 and 3-2 were used. A power-generating test was performed by using these molten carbonate fuel cells. The test was continuously performed for 2,500 hours. After 2,500 hours, the electrolyte losses and cell performance were measured. The relationship between the addition rate of $MgCO_3$-$SrCO_3$ ($MgCO_3$:$SrCO_3$=1:1 in molar ratio) and the electrolyte loss rate is shown in FIG. 5. The electrolyte loss rate of the fuel cell having the electrolyte body of Control 1 is also plotted in FIG. 5.

As shown in FIG. 5, the electrolyte loss of the fuel cell having the electrolyte body of Control 3-1 which was added with 2 mol % of the $MgCO_3$-$SrCO_3$ carbonate mixture reaches 40% after 2,500 hours, and its power-generating characteristic was reduced from 0.85 V (initial value) to 0.54 V by 310 mV. In addition, in the fuel cell having the electrolyte body of Control 3-1, crossover of reaction gases was detected by analysis result of a gas chromatography at the time of power generation. To the contrary, the electrolyte losses of the fuel cells having the electrolyte bodies of Examples 2-1 to 2-4 which were added with 5 mol % or more of the $MgCO_3$-$SrCO_3$ carbonate mixtures were reduced by only about 20%, and their power-generating characteristics were excellent since the voltage was reduced from 0.85 V (initial value) to 0.75 V by only 100 mV. In particular, the electrolyte loss was reduced upon an increase in an addition rate of the $MgCO_3$-$SrCO_3$ carbonate mixture. In the electrolyte bodies (Examples 2-2 to 2-4) added with 10 mol %, 15 mol %, and 20 mol % of the $MgCO_3$-$SrCO_3$ carbonate mixture, the electrolyte losses were about 10%, and their power-generating performance was also excellent.

No change in initial characteristics occurs when about 10 mol % of the $MgCO_3$-$SrCO_3$ carbonate mixture are added. However, the initial values tend to be decreased when the content of the $MgCO_3$-$SrCO_3$ carbonate mixture exceeds 10 mol %. When the content of the $MgCO_3$-$SrCO_3$ carbonate mixture is 20 mol %, the initial voltage becomes 0.65 V which is still an allowable value. However, in the fuel cell having the electrolyte body of Control 3-2 which was added with 24 mol % of the $MgCO_3$-$SrCO_3$ carbonate mixture, a stable characteristic cannot be obtained with a load of 150 mA/cm². A voltage of 0.25 V was exhibited with a load of 50 mA/cm². In this case, the cell cannot serve as a cell.

Examples 3-1-3-4

A total of 5 mol % of $MgCO_3$ (2.5 mol %) and $BaCO_3$ (2.5 mol %), a total of 10 mol % of $MgCO_3$ (5 mol %) and $BaCO_3$ (5 mol %), a total of 15 mol % of $MgCO_3$ (7.5 mol %) and $BaCO_3$ (7.5 mol %), and a total of 20 mol % of $MgCO_3$ (10 mol %) and $BaCO_3$ (10 mol %) were added to four portions of an alkali carbonate mixture ($Li_2CO_3$: 62 mol %, $K_2CO_3$: 38 mol %) serving as an electrolyte to prepare four kinds of powder mixtures. $MgCO_3$ was basic magnesium carbonate ($4MgCO_3.Mg(OH)_2.5H_2O$) and was added to obtain the molar amounts defined above with respect to $MgCO_3$. 35 wt % of $LiAlO_2$ having a specific surface area were added to each powder mixture. Each resultant mixture was placed in an alumina pot, and acetone was added thereto. The resultant mixture was mixed and milled for 20 hours and was dried. Therefore, four kinds of electrolyte bodies each having a thickness of 2.3 mm, a width of 40 mm, and a length of 40 mm were obtained following the same procedures as in Example 2-1.

Controls 4-1 & 4-2

Two kinds of electrolyte bodies were manufactured following the same procedures as in Example 2-1 except that a total of 2 mol % of $MgCO_3$ (1 mol %) and $BaCO_3$ (1 mol %) and a total of 24 mol % of $MgCO_3$ (12 mol %) and $BaCO_3$ (12 mol %) were added to two portions of an alkali carbonate mixture ($Li_2CO_3$: 62 mol %, $K_2CO_3$: 38 mol %) serving as an electrolyte to prepare two kinds of powder mixtures, 35 wt % of $LiAlO_2$ having a specific surface area of 10 to 20 m²/g were mixed in each powder mixture, each resultant mixture was placed in an alumina pot, acetone was added thereto, and each mixture was mixed and milled for 20 hours and dried.

Molten carbonate fuel cells shown in FIGS. 2 and 3 were assembled following the same procedures as in Example 1-1 except that the electrolyte bodies in Examples 3-1 to 3-4 and Controls 4-1 and 4-2 were used. A power-generating test was performed by using these molten carbonate fuel cells. The test was continuously performed for 2,500 hours. After 2,500 hours, the electrolyte losses and cell performance were measured. The relationship between the addition rate of $MgCO_3$-$BaCO_3$ ($MgCO_3$:$BaCO_3$ = 1:1 in molar ratio) and the electrolyte loss rate is shown in FIG. 6. The electrolyte loss rate of the fuel cell having the electrolyte body of Control 1 is also plotted in FIG. 6.

As shown in FIG. 6, the electrolyte loss of the fuel cell having the electrolyte body of Control 4-1 which was added with 2 mol % of the $MgCO_3$-$BaCO_3$ carbonate mixture reaches 39% after 2,500 hours, and its power-generating characteristic was reduced from 0.85 V (initial value) to 0.63 V by 220 mV. In addition, in the fuel cell having the electrolyte body of Control 4-1, crossover of reaction gases was detected by analysis result of a gas chromatography at the time of power generation. To the contrary, the electrolyte losses of the fuel cells having the electrolyte bodies of Examples 3-1 to 3-4 which were added with 5 mol % or more of the $MgCO_3$-$BaCO_3$ carbonate mixtures were reduced by only about 30%, and their power-generating characteristics were excellent since the voltage was reduced from 0.85 V (initial value) to 0.69 V by only 160 mV. In particular, the electrolyte loss was reduced upon an increase in an addition rate of the $MgCO_3$-$BaCO_3$ carbonate mixture. The electrolyte losses were 22%, 16% and 14% in the electrolyte bodies of Examples 3-2, 3-3 and 3-4, respectively, in which the $MgCO_3$-$BaCO_3$ carbonate mixture was added in the amounts of 10 mol %, 15 mol % and 20 mol %, respectively. Degradation of the power-generating characteristic can also be suppressed upon a decrease in electrolyte loss. For example, decreases in power-generating characteristics of the electrolyte bodies (Examples 3-3 and 3-4) containing 15 mol % or more of the $MgCO_3$-$BaCO_3$ carbonate mixture are 100 mV.

No change in initial characteristics occurs when about 15 mol % of the $MgCO_3$-$BaCO_3$ carbonate mixture are added. However, the initial values tend to be decreased when the content of the $MgCO_3$-$SrCO_3$ carbonate mixture exceeds 15 mol %. When the content of the $MgCO_3$-$SrCO_3$ carbonate mixture is 20 mol %, the initial voltage becomes 0.70 V which is still an allowable value. However, in the fuel cell having the electrolyte body of Control 4-2 which is added with 24 mol % of the $MgCO_3$-$BaCO_3$ carbonate mixture, a stable characteristic cannot be obtained with a load of 150 $mA/cm^2$. A voltage of 0.35 V is exhibited with a load of 50 $mA/cm^2$. In this case, the cell cannot serve as a cell.

Examples 4-1-4-4

A total of 5 mol % of $MgCO_3$ (2.5 mol %) and $CaCO_3$ (2.5 mol %), a total of 10 mol % of $MgCO_3$ (5 mol %) and $CaCO_3$ (5 mol %), a total of 15 mol % of $MgCO_3$ (7.5 mol %) and $CaCO_3$ (7.5 mol %), and a total of 20 mol % of $MgCO_3$ (10 mol %) and $CaCO_3$ (10 mol %) were added to four portions of an alkali carbonate mixture ($Li_2CO_3$: 62 mol %, $K_2CO_3$: 38 mol %) serving as an electrolyte to prepare four kinds of powder mixtures. $MgCO_3$ was basic magnesium carbonate ($4MgCO_3 \cdot Mg(OH)_2 \cdot 5H_2O$) and was added to obtain the molar amounts defined above with respect to $MgCO_3$. 35 wt % of $LiAlO_2$ having a specific surface area were added to each powder mixture. Each resultant mixture was placed in an alumina pot, and acetone was added thereto. The resultant mixture was mixed and milled for 20 hours and was dried. Therefore, four kinds of electrolyte bodies each having a thickness of 2.3 mm, a width of 40 mm, and a length of 40 mm were obtained following the same procedures as in Example 2-1.

Controls 5-1 & 5-2

Two kinds of electrolyte bodies were manufactured following the same procedures as in Example 2-1 except that a total of 2 mol % of $MgCO_3$ (1 mol %) and $CaCO_3$ (1 mol %) and a total of 24 mol % of $MgCO_3$ (12 mol %) and $CaCO_3$ (12 mol %) were added to two portions of an alkali carbonate mixture ($Li_2CO_3$: 62 mol %, $K_2CO_3$: 38 mol %) serving as an electrolyte to prepare two kinds of powder mixtures, 35 wt % of $LiAlO_2$ having a specific surface area of 10 to 20 $m^2/g$ were mixed in each powder mixture, each resultant mixture was placed in an alumina pot, acetone was added thereto, and each mixture was mixed and milled for 20 hours and dried.

Figure 7:
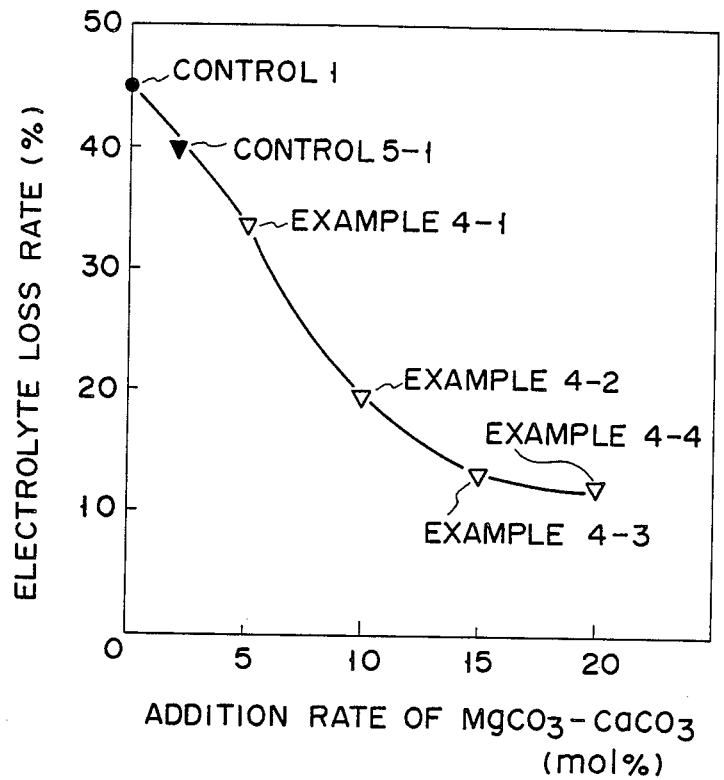
FIG. 7 is a graph showing a relationship between an addition rate of $MgCO_3$-$CaCO_3$ and an electrolyte loss rate.

Molten carbonate fuel cells shown in FIGS. 2 and 3 were assembled following the same procedures as in Example 1-1 except that the electrolyte bodies in Examples 4-1 to 4-4 and Controls 5-1 and 5-2 were used. A power-generating test was performed by using these molten carbonate fuel cells. The test was continuously performed for 2,500 hours. After 2,500 hours, the electrolyte losses and cell performance were measured. The relationship between the addition rate of $MgCO_3$-$CaCO_3$ ($MgCO_3$:$CaCO_3$ = 1:1 in molar ratio) and the electrolyte loss rate is shown in FIG. 7. The electrolyte loss rate of the fuel cell having the electrolyte body of Control 1 is also plotted in FIG. 7.

As shown in FIG. 7, the electrolyte loss of the fuel cell having the electrolyte body of Control 5-1 which was added with 2 mol % of the $MgCO_3$-$CaCO_3$ carbonate mixture reaches 40% after 2,500 hours, and its power-generating characteristic was reduced from 0.85 V (initial value) to 0.61 V by 240 mV. In addition, in the fuel cell having the electrolyte body of Control 5-1, crossover of reaction gases was detected by analysis result of a gas chromatography at the time of power generation. To the contrary, the electrolyte losses of the fuel cells having the electrolyte bodies of Examples 4-1 to 4-4 which were added with 5 mol % or more of the $MgCO_3$-$CaCO_3$ carbonate mixtures were greatly reduced as compared with that in Control 5-1. In particular, the electrolyte loss was reduced upon an increase in an addition rate of the $MgCO_3$-$CaCO_3$ carbonate mixture. The electrolyte losses were 19%, 13% and 12% in the electrolyte bodies of Examples 4-2, 4-3, and 4-4, respectively, in which the $MgCO_3$-$CaCO_3$ carbonate mixture was added in the amounts of 10 mol %, 15 mol % and 20 mol %, respectively. Degradation of the power-generating characteristic can also be suppressed upon a decrease in electrolyte loss. For example, a voltage of the electrolyte body (Examples 4-2) containing 10 mol % of the $MgCO_3$-$CaCO_3$ carbonate mixture was decreased from 0.85 (initial value) to 0.73 V by only 120 mV, and a minimum drop of the power-generating characteristic of the fuel cell having the electrolyte body (Example 4-3) added with 15 mol % of the $MgCO_3$-$CaCO_3$ carbonate mixture was 60 mV.

No change in initial characteristics occurs when about 10 mol % of the $MgCO_3$-$CaCO_3$ carbonate mixture are added. However, the initial values tend to be decreased when the content of the $MgCO_3$-$CaCO_3$ carbonate mixture exceeds 10 mol %. When the content of the $MgCO_3$-$CaCO_3$ carbonate mixture is 20 mol %, the initial voltage becomes 0.70 V which is still an allowable value. However, in the fuel cell having the electrolyte body of Control 5-2 which is added with 24 mol % of the $MgCO_3$-$CaCO_3$ carbonate mixture, a stable characteristic cannot be obtained with a load of 150 $mA/cm^2$. A voltage of 0.35 V is exhibited with a load of 50 $mA/cm^2$. In this case, the cell cannot serve as a cell.

Example 5-1

40 wt % of $LiAlO_2$ having a specific surface area of 10 to 20 $m^2/g$ were mixed in an alkali carbonate mixture ($Li_2CO_2$: 62 mol %, $K_2CO_3$: 38 mol %) serving as an electrolyte. The mixture was placed in an alumina pot, and acetone was added thereto. The resultant mixture was mixed and milled for 20 hours. Thereafter, the mixture was dried to prepare a first powder mixture used for forming an electrode reaction portion of the electrolyte body.

20 mol % of $BaCO_3$ were added to an alkali carbonate mixture ($Li_2CO_2$: 62 mol %, $K_2CO_3$: 38 mol %) serving as an electrolyte. 40 wt % of an $LiAlO_2$ powder having a specific surface area of 10 to 20 $m^2/g$ with respect to the alkali carbonate mixture were added to the above mixture, and acetone was added thereto. The mixture was mixed and milled for 20 hours, and dried to prepare a second powder mixture used for forming an edge portion (i.e., a contact portion with an edge seal plate) of the electrolyte body.

The second powder mixture was filled in a peripheral portion of a square mold, and the first powder mixture was filled in the remaining portion. The first and second powders were hot-pressed at 465° C. and 300 $kg/cm^2$ to prepare an electrolyte body added with 20 mol % of $MgCO_3$ in the edge portion and 10 mol % of $MgCO_3$ in the remaining portion. The electrolyte body had a thickness of 2.3 mm, a width of 40 mm, and a length of 40 mm.

Example 5-2 - 5-4

Three electrolyte bodies were prepared following the same procedures as in Example 5-1, except that 20 mol % of $SrCO_3$, 20 mol % of $CaCO_3$, and 20 mol % of $MgCO_3$ were added to three portions of an alkali carbonate mixture ($Li_2CO_3$: 62 mol %, $K_2CO_3$: 38 mol %) as an electrolyte, and 40 wt % of an $LiAlO_2$ powder having a specific surface area of 10 to 20 $m^2/g$ with respect to the alkali carbonate mixture were added thereto, the resultant mixture was placed in an alumina pot, acetone was added thereto, this mixture was mixed and milled for 20 hours and dried, and dried three kids of second powders were used.

Example 6-1

10 mol % of $MgCO_3$ were added to an alkali carbonate mixture ($Li_2CO_2$: 62 mol %, $K_2CO_3$: 38 mol %) serving as an electrolyte, and 35 wt % of $LiAlO_2$ having a specific surface area of 10 to 20 $m^2/g$ were added thereto. The mixture was placed in an alumina pot, and acetone was added thereto. The resultant mixture was mixed and milled for 20 hours. Thereafter, the mixture was dried to prepare a first powder mixture used for forming an electrode reaction portion of the electrolyte body.

20 mol % of $MgCO_3$ were added to an alkali carbonate mixture ($Li_2CO_2$: 62 mol %, $K_2CO_3$: 38 mol %) serving as an electrolyte. 40 wt % of an $LiAlO_2$ powder having a specific surface area of 10 to 20 $m^2/g$ with respect to the alkali carbonate mixture were added to the above mixture, and acetone was added thereto. The mixture was mixed and milled for 20 hours, and dried to prepare a second powder mixture used for forming an edge portion (i.e., a contact portion with an edge seal plate) of the electrolyte body.

An electrolyte body having a thickness of 2.3 mm, a width of 40 mm, and a length of 40 mm was prepared following the same procedures as in Example 5-1 by hot pressing using a mold and the first and second powder mixtures. In this case, 20 mol % of $MgCO_3$ were contained in the edge portion of the electrolyte body, while 10 mol % of $MgCO_3$ were contained in the remaining portion of the electrolyte body.

Example 6-2

A total of 10 mol % of $MgCO_3$ (5 mol %) and $SrCO_3$ (5 mol %) were added to an alkali carbonate mixture ($Li_2CO_2$: 62 mol %, $K_2CO_3$: 38 mol %) serving as an electrolyte. 35 wt % of an $LiAlO_2$ powder having a specific surface area of 10 to 20 $m^2/g$ with respect to the alkali carbonate mixture were added to the above mixture, and acetone was added thereto. The mixture was mixed and milled for 20 hours. The resultant material was dried to prepare a first powder mixture used for forming an electrode reaction portion of the electrolyte body.

A total of 20 mol % of $MgCO_3$ (10 mol %) and $SrCO_3$ (10 mol %) were added to an alkali carbonate mixture ($Li_2CO_2$: 62 mol %, $K_2CO_3$: 38 mol %) serving as an electrolyte. 40 wt % of an $LiAlO_2$ powder having a specific surface area of 10 to 20 $m^2/g$ with respect to the alkali carbonate mixture were added to the above mixture, and acetone was added thereto. The mixture was mixed and milled for 20 hours, and dried to prepare a second powder mixture used for forming an edge portion (i.e., a contact portion with an edge seal plate) of the electrolyte body.

An electrolyte body having a thickness of 2.3 mm, a width of 40 mm, and a length of 40 mm was prepared following the same procedures as in Example 5-1 by hot pressing using a mold and the first and second powder mixtures. In this case, 10 mol % of $MgCO_3$ and 10 mol % of $SrCO_3$ were contained in the edge portion of the electrolyte body, while 5 mol % of $MgCO_3$ and 5 mol % of $SrCO_3$ were contained in the remaining portion of the electrolyte body.

Molten carbonate fuel cells shown in FIGS. 2 and 3 were assembled following the same procedures as in Example 1-1 except that the electrolyte bodies prepared in Examples 5-1 to 5-4, 6-1, and 6-2 and Control 1 were used, and a power-generating test was performed. States of the electrolyte body edge portions (contact portions with the edge seal plates) in a temperature cycle of 200° to 700° C. and changes in weights of the electrolyte body edge portions after an 2,000-hour operation were measured.

When 10 temperature cycles were completed, several cracks were formed in the edge portion of the electrolyte body of Control 1. To the contrary, even when 20 heat cycles were completed, no abnormality was found in the electrolyte bodies of Examples 5-1 to 5-4, and 6-1 to 6-2 wherein 20 mol % of $BaCO_3$, $SrCO_3$, $CaCO_3$, $MgCO_3$, and the $MgCO_3$-$SrCO_3$ mixture, respectively, were added to the edge portions. Even if 30 heat cycles were completed, noticeable cracks were not found.

In a fuel cell having the electrolyte body of Control 1, a decrease in weight of the electrolyte body edge portion after the 2,000-hour operation was measured to be 35%. To the contrary, decreases in weights of the electrolyte bodies of the fuel cells having the electrolyte bodies of Examples 5-1 to 5-4, and 6-1 and 6-2 were measured to fall within 5% each after the 2,000-hour operation.

In the fuel cells having the electrolyte body of Example 6-1 which is added with 10 mol % of $MgCO_3$ to the remaining portion except for the edge portion and having the electrolyte body of Example 6-2 which is added with 10 mol % of $MgCO_3$ and 10 mol % of $SrCO_3$ in the remaining portion except for the edge portion, the electrolyte loss rates were very low and good power-generating characteristics can be obtained in the same manner as in Examples 1-1 and 2-2.

Examples 7-1 to 7-4

10 mol % of $BaCO_3$, $SrCO_3$, $CaCO_3$, and $MgCO_3$, respectively, were added to an alkali carbonate mixture ($Li_2CO_3$: 62 mol %, $K_2CO_3$: 38 mol %), and 55 wt % of $LiAlO_2$ having a specific surface area of 10 to 20 $m^2/g$ with respect to the alkali carbonate mixture were added to each powder mixture. Each mixture was placed in an alumina pot, toluene was added thereto, and the resultant material was mixed and milled. 100 parts by weight of polyvinylbutyral and 20 parts by weight of dibutylphthalate were added to each mixture, thereby preparing four kinds of electrolyte slurries. These slurries were molded by means of a doctor blade molder, thereby preparing four kinds of sheet-like electrolyte bodies.

An anode made of a porous nickel-based alloy having a porosity of 60% was impregnated with an alkali carbonate mixture ($Li_2CO_3$: 62%, $K_2CO_3$: 38 mol %) by a melting method.

Control 6

55 wt % of $LiAlO_2$ having a specific surface area of 10 to 20 $m^2/g$ Were added to an alkali carbonate mixture ($Li_2CO_3$: 62 mol %, $K_2CO_3$: 38 mol %). The mixture was placed in an alumina pot, toluene was added thereto, and the resultant material was mixed and milled. 100 parts by weight of polyvinylbutyral and 20 parts by weight of dibutylphthalate were added to the mixture, thereby preparing an electrolyte slurry. The slurry was molded by means of a doctor blade molder, thereby preparing a sheet-like electrolyte body.

Molten carbonate fuel cells shown in FIGS. 2 and 3 were assembled following the same procedures as in Example 1-1 except that the electrolyte bodies of Examples 7-1 to 7-4 and Control 6, the anode made of the porous nickel-based alloy having a porosity of 60% and impregnated with the electrolyte and a cathode made of a porous nickel-based alloy having a porosity of 60% but not added with an electrolyte were used. Each fuel cell was heated to 650° C. within 10 hours while a gas mixture of 80 vol % of $H_2$ and 20 vol % of $CO_2$ was supplied as a fuel gas to the anode of each fuel cell, and a gas mixture of 70 vol % of air and 30 vol % of $CO_2$ was supplied as an oxidant gas to the cathode. During the temperature rise process, 5 vol % of He were mixed in the gas mixture supplied to the anode, and He leakage was detected by gas chromatography at the cathode-side outlet, thereby evaluating the cracking states of the electrolyte bodies during the temperature rise process. The presence/absence of production of water from the cathode and open-circuit voltages were evaluated. Test results are summarized in Table 2.

TABLE 2

| | Additive in Electrolyte body | Open-Circuit Voltage (V) | Cathode-Side Outlet | |
|---|---|---|---|---|
| | | | Leak (He: vol %) | Production of Water |
| Example 7-1 | $BaCO_3$ | 1.07 | 0.01 | No |
| Example 7-2 | $SrCO_3$ | 1.06 | 0.02 | No |
| Example 7-3 | $CaCO_3$ | 1.07 | 0.01 | No |
| Example 7-4 | $MgCO_3$ | 1.08 | 0.01 | No |
| Control 6 | — | 0.99 | 0.90 | Yes |

As shown in Table 2, in a fuel cell having the electrolyte body of Control 6 which did not have any additive such as $BaCO_3$, He greatly leaked from the cathode side during the temperature rise. In addition, water was also greatly produced. Production of water occurred when $H_2$ on the anode side was subjected to crossover, i.e., $H_2$ was diffused to the cathode side upon formation of a large crack in the electrolyte body during the temperature rise. Therefore, $H_2$ was reacted with $O_2$ to produce water. Since such extreme gas crossover occurred, an open-circuit voltage was greatly lowered immediately after the temperature rise. To the contrary, in the fuel cells having the electrolyte bodies of Examples 7-1 to 7-4 which were added with $BaCO_3$, $SrCO_3$, $CaCO_3$, and $MgCO_3$, no water was produced from the cathode sides during the temperature rise, and at the same time, leakage amounts of He were very small. Therefore, large cracks were not formed in these electrolyte bodies. In the fuel cells having the electrolyte bodies of Examples 7-1 to 7-4, normal electrode reactions were confirmed because the open-circuit voltages after the temperature rise were 1.06 V or more.

According to the present invention as has been described above, there is provided a molten carbonate fuel cell wherein the power-generating characteristics are not impaired, outflow of an electrolyte in the electrolyte body can be minimized, an increase in resistance of the electrolyte body by an electrolyte loss can be suppressed, and generation of gas crossover can also be suppressed, thereby achieving a long-term operation and a long life time. There is also provided a molten carbonate fuel cell wherein outflow of the electrolyte from an electrolyte body edge portion which contacts an edge seal plate can be reduced to improve gas sealing performance between the electrolyte body and the edge seal plate.

What is claimed is:

1. A molten carbonate fuel cell comprising:
   a pair of conductive electrodes;
   an electrolyte body sandwiched between said pair of conductive electrodes and consisting essentially of an electrolyte of an alkali carbonate mixture, more than 5 mol % to 15 mol % of magnesium carbonate with respect to said alkali carbonate mixture, and an electrolyte retaining material;
   fuel supplying means for supplying a fuel gas to one of said pair of conductive electrodes; and
   oxidant supplying means for supplying an oxidant gas to the other of said pair of conductive electrodes.

2. A cell according to claim 1, wherein an amount of said magnesium carbonate added to said electrolyte body falls within a range of 6 to 14 mol % with respect to said alkali carbonate mixture.

3. A cell according to claim 1, wherein said magnesium carbonate contained in an edge portion of said electrolyte body is higher concentration than in the remaining portion of said electrolyte body and falls within a range of 15 to 35 mol % with respect to said alkali carbonate mixture.

4. A cell according to claim 1, wherein said alkali carbonate mixture is a mixture of lithium carbonate and at least one material selected from the group consisting of potassium carbonate, and sodium carbonate.

5. A cell according to claim 1, wherein said electrolyte retaining material consists of lithium aluminate.

6. A molten carbonate fuel cell comprising:
a pair of conductive electrodes;
an electrolyte body sandwiched between said pair conductive electrodes and consisting essentially of an electrolyte of an alkali carbonate mixture, a carbonate mixture, and an electrolyte retaining material, said carbonate mixture consisting of magnesium carbonate and at least one material selected from the group consisting of barium carbonate, calcium carbonate, and strontium carbonate, said carbonate mixture being used in 5 to 20 mol % with respect to said alkali carbonate mixture, said magnesium carbonate being used 2 to 15 mol % with respect to said alkali carbonate mixture;
fuel supplying means for supplying a fuel gas to one of said pair of conductive electrodes; and
oxidant supplying means for supplying an oxidant gas to the other of said pair of conductive electrodes.

7. A cell according to claim 6, wherein an amount of said carbonate mixture added to said electrolyte body falls within a range of 7 to 15 mol % with respect to said alkali carbonate mixture.

8. A cell according to claim 6, wherein said carbonate mixture contained in an edge portion of said electrolyte body is higher concentration than in the remaining portion of said electrolyte body and falls within a range of 15 to 35 mol % with respect to said alkali carbonate mixture.

9. A cell according to claim 6, wherein said alkali carbonate mixture is a mixture of lithium carbonate and at least one material selected from the group consisting of potassium carbonate, and sodium carbonate.

10. A cell according to claim 6, wherein said electrolyte retaining material consists of lithium aluminate.

11. A molten carbonate fuel cell comprising:
a pair of conductive electrodes;
an electrolyte body sandwiched between said pair of conductive electrodes and consisting essentially of an electrolyte of an alkali carbonate mixture, at least one carbonate added in an edge portion of said electrolyte body used in 15 to 35 mol % with respect to said alkali carbonate mixture, and selected from the group consisting of magnesium carbonate, barium carbonate, calcium carbonate, and strontium carbonate, and an electrolyte retaining material;
fuel supplying means for supplying a fuel gas to one of said pair of conductive electrodes; and
oxidant supplying means for supplying an oxidant gas to the other of said pair of conductive electrodes.

* * * * *